S. SARGENT.
Lantern.
No. 2,158.
Reissued Jan. 23, 1866.
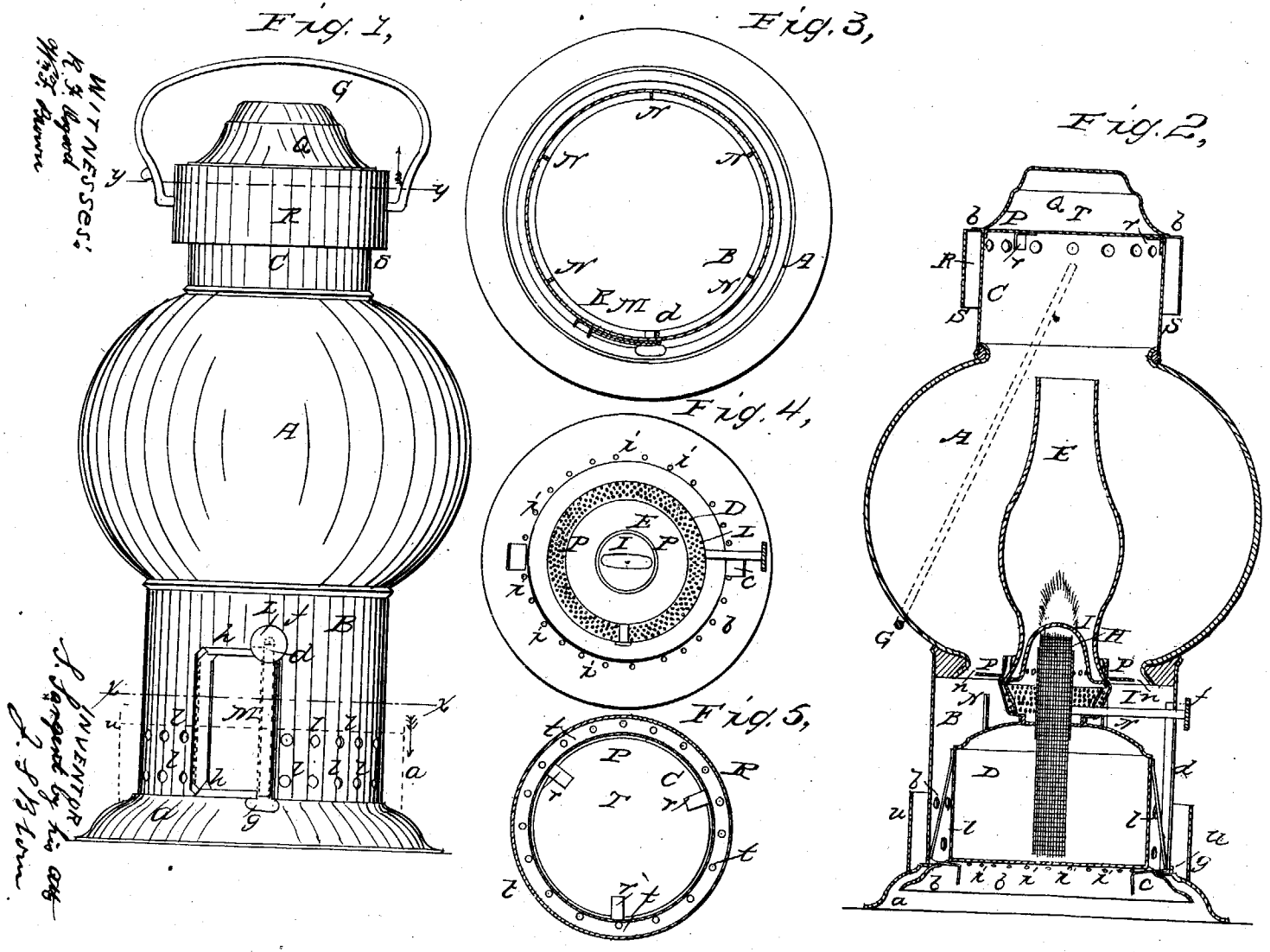
N. PETERS, Photo-Lithographer, Washington, D. C.

UNITED STATES PATENT OFFICE.

SUMNER SARGENT, OF WATERTOWN, MASSACHUSETTS, ASSIGNOR, BY MESNE ASSIGNMENTS, TO HIMSELF, A. P. KNAPP, AND EDWARD MILLER, OF SAME PLACE.

IMPROVEMENT IN COAL-OIL LANTERNS.

Specification forming part of Letters Patent No. 33,312, dated September 17, 1861; Reissue No. 2,158, dated January 23, 1866.

*To all whom it may concern:*

Be it known that I, SUMNER SARGENT, of Watertown, in the county of Middlesex and State of Massachusetts, have invented a new improved lantern for burning coal-oil and other oils containing a large proportion of carbon; and I do hereby declare that the following is a full and exact description thereof, reference being had to the accompanying drawings, making part of this specification.

Figure 1 is a side elevation of the lantern complete; Fig. 2, a central vertical section thereof; Fig. 3, a transverse section of the lantern body looking downward in a plane indicated by the line *x x*, Fig. 1; Fig. 4, a plan of the lamp detached; Fig. 5, a transverse section of the lantern-body, looking upward, in a plane indicated by the line *y y*, Fig. 1.

Like letters designate corresponding parts in all of the figures.

As in constructing lamps for burning the particular oils referred to in this specification the great difficulties to overcome arise from the necessity of a large, even, and uninterrupted supply of oxygen to the burner, which difficulties are increased when the lamps are designed to be portable, on account of the necessary derangements of the supply of air to support the combustion by the unsteadiness of motion and subjecting the lamps more to sudden blasts of air, so in the construction of lanterns for burning these oils all the difficulties named are rather increased than diminished, and the additional difficulties arising from the use of the lantern body or case and holding the whole beneath the hand are required to be overcome. My present improvements have principal reference to overcoming these additional difficulties, while any improvements in the lamps of lanterns may be employed in connection with them.

I employ for the lantern-body a glass globe, A, base B, top C, and cap Q, all to be carried by a bail or handle, G, and constructed in any usual or convenient manner. The general construction of the lamp D may also be of any style or plan desirable, and the burner S may be provided with the most efficient improvements for burning the oils. A chimney, E, is also employed, being wholly within the glass globe A.

The lamp-base *b* fits closely within the base B of the lantern-body, and it is confined therein by two spring-catches, *c c*, attached to the lamp and springing over a flange, *e*, on the inside of the base B, all substantially as shown in Fig. 2. Any equivalent arrangement for the purpose may be employed.

My first improvement is intended for the purpose of enabling the wick H to be regulated from outside of the lantern-body without taking out the lamp, and in connection therewith of securing the proper arrangement of the lantern-body to admit that improvement. I make the rod or shaft L, by which the wick is moved, long enough to reach out through the side of the base B of the lantern-body when the lamp is inserted therein, so that its head *f* may be turned with as perfect ease and readiness as that of a simple lamp; but in order to allow this extension of the shaft L out through the lantern-body provision must be made for reaching the aperture which it occupies in the lantern-base when inserting the lamp and for withdrawing it from said aperture when the lamp is taken out of the lantern-body, and the side of the lantern-body must also be kept closed when burning, so as not to disturb the draft of air proceeding to the burner. To accomplish these purposes, I form a vertical slot, *d*, in the side of the lantern-base B wide enough to admit the shaft L, and reaching from the bottom of the lantern-base to the necessary height for the position of said shaft. A larger opening, *g*, Fig. 2, is also made in the foot or flaring bottom *a* of the lantern to allow the passage of the head *f* of the shaft L up and down. This slot allows the free insertion and withdrawal of the shaft L. To close this slot after the insertion of the said shaft I employ a plate, M, which fits closely upon the side of the base B and slides between lips *h h*, so that it may be readily shut over the slot *d*, as shown by black lines, or be moved away therefrom, as shown by red lines, in Fig. 1. Thus the whole purpose intended is perfectly accomplished. Any equivalent arrangement for covering and uncovering the slot *d* may be employed.

The draft to the lamp-burner is ordinarily admitted through small holes *l l* in the sides or periphery of the base B of the lantern-body, so that the ordinary motion through the atmosphere in walking will not impede the progress of the air into the lantern, but when the lantern is suddenly lowered the foot *a* thereof interrupts the steady and ready flow of the air through the holes *l l*, and for the moment would cause the lamp to smoke, unless some provision should be made to prevent it. To accomplish this I perforate the base-flange *b* of the lamp with small apertures *i i*, as seen in Figs 2 and 4. The apertures admit air from below the lamp, where its flow is rather increased than impeded by the descent of the lantern.

It may be remarked here that to properly regulate the flow of air to the burner it is necessary that it should be admitted through numerous small apertures instead of through one or a few large ones, or otherwise by breaking up the currents or making the passage or passages indirect.

It is obvious that the method of introducing the air is not essential in this case, provided the inward flow is sufficiently controlled or equalized; but the vital feature here is to introduce the air below the rim or edge of the lantern-base, so as to catch the air in the lantern's sudden descent.

My next improvement is the counterpart in effect to that just described, and consists in a suitable arrangement for collecting the draft for the burner when the lantern is suddenly raised instead of lowered. This I generally accomplish by the employment of an annular band, cylinder, or cup, *u*, open at the top, so as to collect the air as the lantern ascends, and below surrounding and inclosing the draft holes to the burner, so as to force or direct the air in through the same. I usually employ the ordinary side-draft holes *l l* for this purpose, since this simplifies the construction and does not interfere with but rather improves the operation of the ordinary side and stationary draft.

My next improvement consists in the employment of a horizontal perforated plate, P, extending outward from the lamp-burner S, just above the draft-perforations therein, nearly to the body of the lantern. The construction and use of this plate will be understood after explaining the action of the draft-air inside of the lantern-burner. The main object and portion of the air admitted into the base of the lantern to support the combustion of the oil at the burner, but another portion is intended to proceed directly upward into the glass globe A outside of the chimney E, the uses of which circulation of air are to keep the lantern as cool as possible and to facilitate the out-draft at the top of the lantern, and, by consequence, to increase the regular action of the entire draft. Another use of this passage of air is to furnish a guard or regulator against a too great accumulation or sudden supply of air to the burner itself by affording a relieving escape therefor. To effect these desired results, and yet not diminish the proper supply of air to the burner at all times, there is a narrow annular space, *n*, Fig. 2, left outside of the edge of the plate P, to allow a regular circulation of the air upward outside of the chimney E. The plate P is also perforated with very fine holes, as seen most clearly in Fig. 4, so that, while it always arrests sufficient air to supply the burner, its perforations prevent a sudden overaccumulation and pressure of air by allowing the excess quickly, though not instantaneously, to escape upward into the globe of the lantern. The device may therefore be termed the "draft-governor."

My next improvement consists in the employment of a guard-cylinder or annular plate R, around the top, C, of the lantern and outside of the draft-escape apertures *o o*, leaving a space between it and the lantern-top of a fourth of an inch, more or less, all around, open at the bottom, as at *s*, Fig. 2, and terminating in perforations *t t*, Figs. 2 and 5, at the top, through the flange by which the guard-cylinder is attached to the lantern-top. This cylinder accomplishes several purposes. First, it affords a shield or guard to the draft-escape apertures *o o*, so as to prevent gusts of air impeding the escape of the draft, by furnishing a circulation of air upward in the space between it and the lantern-top, and, producing thereby an exhausting action on the lantern draft, it assists the same, and, finally, by mingling cool outer air with the escaping hot air of the draft it reduces the temperature of the same to a degree low enough not to discommode the hand of the person carrying the lantern.

I make use of a shield, T, in the top of the lantern-body, in order to prevent an overheating thereof too great for the hand in carrying the lantern. This consists of a thin plate of metal, located just above the draft-escape apertures *o o* and at the bottom of the convex cap Q of the lantern. It does not quite cover the whole top of the lantern, but there is a narrow annular space, *p*, Fig. 2, around its edge, so as to allow a circulation of the draft to some extent above it in the cap Q, and thereby prevent heating the air therein very hot. At the same time this shield-plate produces all the good effect of interposing a non-conducting space to prevent the conduction of undue heat upward. The plate T may be attached to the lantern-top C by narrow supporting-strips *r r*, so as to close as little of the annular space *p* as may be.

What I claim as my invention, and desire to secure by Letters Patent, is—

1. The employment of an aperture, or its equivalent, in the lantern-case, through which the shaft, or its equivalent, of the wick-regulator extends, so as to be reached outside of the lantern-case, said aperture having a slot or lateral passage leading to it for the introduction of the said shaft, or equivalent part, of the wick-regulator into the aperture and its withdrawal therefrom in the act of inserting and taking out the lantern-lamp, the whole constituting a convenient arrangement for enabling the wick to be regulated outside of the lantern-case, and at the same time keeping it closed, so as not to disarrange the draft, substantially as and for the purpose herein specified.

2. In combination with the above, the plate M, or its equivalent, for covering and uncovering the passage leading to the regulator-aperture in the lantern-case, as set forth.

3. The arrangement and combination of the perforations *i i* in the base-flange of the lamp D, the draft-collector *u*, division-plates N N, perforated regulating-plate P, and guard-cylinder R, in the manner and for the purposes herein specified.

The above specification signed by us this 30th day of September, 1863.

SUMNER SARGENT.
ALVIN P. KNAPP.

Witnesses:
ABIEL ABBOTT,
A. HAYDN KNAPP.